United States Patent
Adapaka et al.

(10) Patent No.: US 11,975,986 B2
(45) Date of Patent: May 7, 2024

(54) METHOD OF PREPARING AN ELECTRODE MATERIAL FOR LITHIUM-ION BATTERIES

(71) Applicant: CHAIRMAN, DEFENCE RESEARCH AND DEVELOPMENT ORGANISATION (DRDO), New Delhi (IN)

(72) Inventors: Srinivas Kumar Adapaka, Andhra Pradesh (IN); Satyavani Triumala Venkata Sesha Lakshmi, Andhra Pradesh (IN)

(73) Assignee: CHAIRMAN, DEFENCE RESEARCH AND DEVELOPMENT ORGANISATION (DRDO), New Delhi (IN)

( * ) Notice: Subject to any disclaimer, the term of this patent is extended or adjusted under 35 U.S.C. 154(b) by 462 days.

(21) Appl. No.: 17/288,694

(22) PCT Filed: Oct. 3, 2019

(86) PCT No.: PCT/IN2019/050730
§ 371 (c)(1),
(2) Date: Apr. 26, 2021

(87) PCT Pub. No.: WO2020/084631
PCT Pub. Date: Apr. 30, 2020

(65) Prior Publication Data
US 2021/0395104 A1  Dec. 23, 2021

(30) Foreign Application Priority Data
Oct. 24, 2018 (IN) .............................. 201811040147

(51) Int. Cl.
*C01G 49/00* (2006.01)
*H01M 4/04* (2006.01)
*H01M 4/58* (2010.01)

(52) U.S. Cl.
CPC ........ *C01G 49/009* (2013.01); *H01M 4/0433* (2013.01); *H01M 4/0471* (2013.01);
(Continued)

(58) Field of Classification Search
CPC ... B29C 65/486; B29C 44/445; B29C 43/006; B29C 48/04; B29C 2045/1883;
(Continued)

(56) References Cited

FOREIGN PATENT DOCUMENTS

CN           100398434 C        7/2008

OTHER PUBLICATIONS

Kumar et al., "Effect of Niobium Doping on Electrochemical Properties of Microwave Synthesized Carbon Coated Nanolithium Iron Phosphate for High Rate Underwater Applications," Journal of Electrochemical Energy Conversion and Storage, vol. 16, May 31, 2019, 8 Pages.

(Continued)

*Primary Examiner* — Stella K Yi
(74) *Attorney, Agent, or Firm* — Workman Nydegger

(57) ABSTRACT

The present invention discloses a method of preparing an electrode material for lithium-ion batteries comprising the steps of preparing a mixture of precursors taken in predefined stoichiometric ratios for synthesis of lithium iron phosphate (LiFePO4), adding niobium pentoxide as a precursor for doping of niobium at Li+ site of $LiFePO_4$ for synthesis of niobium doped $LiFePO_4$ and ball milling operation provides nano sized powder particles. Now, a precursor of carbon is added to said mixture of precursors for synthesizing and obtaining carbon coated niobium doped $LiFePO_4$ nano sized powder particles. Pellets of required size are prepared and sintered. The obtained pellets are structurally characterized.

19 Claims, 5 Drawing Sheets

(52) U.S. Cl.
CPC ....... *H01M 4/5825* (2013.01); *C01P 2002/72* (2013.01); *C01P 2004/03* (2013.01); *C01P 2004/64* (2013.01); *C01P 2006/40* (2013.01)

(58) Field of Classification Search
CPC ......... B29C 48/345; B29C 2045/0091; H01M 4/5825; H01M 4/0471; H01M 4/0433; C01G 49/009
See application file for complete search history.

(56) References Cited

OTHER PUBLICATIONS

Search Report from corresponding Indian Application No. 201811040147, dated May 18, 2020.
International Search Report and Written Opinion PCT Application No. PCT/IN2019/050730, dated Dec. 17, 2019.

METHOD OF PREPARING AN ELECTRODE MATERIAL FOR LITHIUM-ION BATTERIES

TECHNICAL FIELD OF THE INVENTION

The present invention relates to Lithium-ion batteries and more particularly relates to electrode material of Lithium-ion batteries.

BACKGROUND OF THE INVENTION

Battery technology is a core technology for all future-generation clean-energy vehicles such as fuel cell vehicles, electric vehicles, and plug-in hybrid vehicles. Promising for the future and still undergoing rapid development is the technology of reversible lithium cell. Lithium-ion battery technology has the potential to meet the requirements of high energy density and high-power density applications. Among all phosphates, lithium iron phosphate exhibits good reversible electrochemical lithium insertion/extraction reactions. Lithium iron phosphate lies within its tolerance range to overcharge/discharge, thereby less prone to thermal runaway.

However, LiFePO$_4$ has a low intrinsic electronic conductivity and shows slow Li$^+$ diffusion across the LiFePO$_4$/FePO$_4$ phase boundary during charge/discharge processes, limiting its performance rate. The slow diffusion rate of Li$^+$ may be attributed to a variety of material properties such as large miscibility gap, dimensionality, and nature of defect sites.

A conventional method describes a method of preparation of metal-doped carbon coated lithium iron phosphate of microspheres of particle size of 15~40 μm for enhancing the conductivity.

In yet another conventional method a preparation of a compound doped and cladded lithium-ion cell anode material LiFePO$_4$ is described for enhancing the conductivity. The method comprises the steps of mixing, pulping and drying raw materials to obtain a powdery precursor; pre-sintering the powdery precursor; performing secondary burdening and ball milling on the pre-sintered product, and sintering the mixture to obtain lithium-ion cell anode material LiFePO$_4$.

However, with the compositions obtained thereof, or the methods adopted, the limitation of low intrinsic electronic conductivity and slow Li$^+$ diffusion still exists and therefore conventional methods tends to be ineffective in solving the problem.

SUMMARY OF THE INVENTION

According to an embodiment of the invention, a method of preparing an electrode material for lithium-ion batteries comprises the steps of preparing a mixture of precursors taken in predefined stoichiometric ratios for synthesis of lithium iron phosphate (LiFePO$_4$) and adding niobium pentoxide as a precursor for doping of niobium at Li+ site of LiFePO$_4$ for synthesis of niobium doped LiFePO$_4$.

According to the embodiment, the steps include ball milling of said mixture of precursors dry ground to obtain nano sized powder particles of niobium doped LiFePO$_4$. Then to said mixture, a precursor of carbon is added, and ball milled for synthesizing and obtaining carbon coated niobium doped LiFePO$_4$ nano sized powder particles.

According to the embodiment, pellets of required size are prepared and sintered. The obtained pellets are structurally characterized.

According to the embodiment, one or more compositions of Li$_{1-x}$Nb$_x$FePO$_4$/C, where x is equal to 0-0.15 are synthesized from solid state vacuum synthesis method.

According to the embodiment, a composition of Li$_{0.9}$Nb$_{0.1}$FePO$_4$/C is preferable and has a carbon content of about 8.8%.

BRIEF DESCRIPTION OF THE DRAWINGS

The various aspects, features, and advantages of the embodiment of the present invention, hereinafter more particularly described, will be more apparent from the following description taken in conjunction with the drawings, in which:

FIG. 2 (b) shows a scanning electron micrograph of Li$_{0.9}$Nb$_{0.05}$FePo$_4$ powder with an average particle size of 36 nm according to an embodiment of the present invention;

FIG. 2 (c) shows a scanning electron micrograph of Li$_{0.9}$Nb$_{0.01}$FePo$_4$ powder with an average particle size of 47 nm according to an embodiment of the present invention; and FIG. 2 (d) shows a scanning electron micrograph of Li$_{0.85}$Nb$_{0.15}$FePo$_4$ powder with an average particle size of 62 nm according to an embodiment of the present invention.

DETAILED DESCRIPTION OF THE EMBODIMENTS OF THE INVENTION

Figure 1:
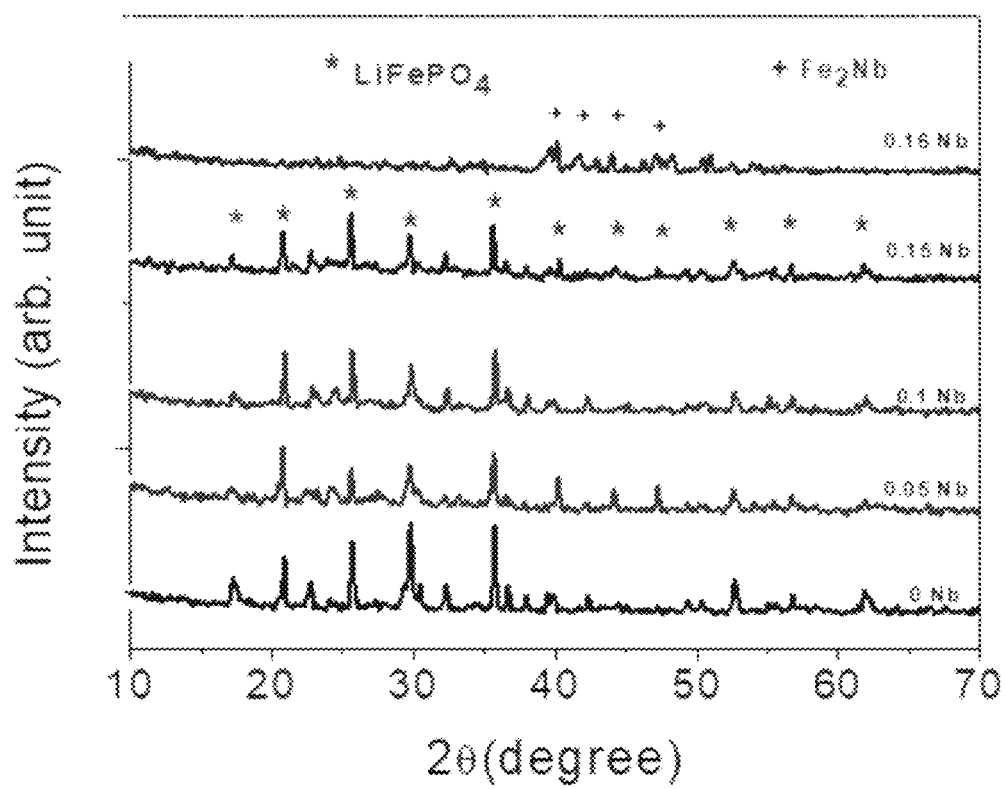
FIG. 1 shows an X-Ray diffraction pattern of one or more synthesized compositions of Li$_{1-x}$Nb$_x$FePO$_4$/C (x=0.05, 0.1, 0.15, 0.16) according to an embodiment of the present invention.

The embodiments herein are explained more fully with reference to the accompanying drawings and detailed in the following description. The examples used herein drawings are intended merely to facilitate an understanding of ways in which the embodiment herein can be practiced by those skilled in the art and should not be construed as limiting the scope of the embodiment herein.

According to an embodiment of the invention, a method of preparing an electrode material for lithium-ion batteries comprises the steps of preparing a mixture of lithium carbonate, iron oxalate and ammonium di-hydrogen phosphate precursors taken in predefined stoichiometric ratios for synthesis of lithium iron phosphate (LiFePO4), adding niobium pentoxide as a precursor for doping of niobium at Li+ site of LiFePO$_4$ for synthesis of niobium doped LiFePO$_4$ and ball milling said mixture of precursors dry ground to obtain nano sized powder particles of niobium doped LiFePO$_4$.

According to the embodiment of the invention, the steps includes adding and ball milling a precursor of carbon to said mixture of precursors for synthesizing and obtaining carbon coated niobium doped LiFePO$_4$ nano sized powder particles.

According to the embodiment, said mixture of precursors are synthesized by solid state vacuum synthesis for obtaining one or more compositions of Li$_{1-x}$Nb$_x$FePO$_4$/C (where x is equal to 0 to 0.15) nano sized powder particles.

According to the embodiment of the invention, a composition of Li$_{0.9}$Nb$_{0.1}$FePO$_4$/C is preferable and has a carbon content of about 8.8%.

According to the embodiment, pellets are prepared and sintered from said synthesized nano powder particles at a predetermined temperature for a predetermined time.

According to the embodiment of the invention, the steps further includes structurally characterizing said sintered pellets for identifying standard orthorhombic olivine type LiFePO4 structure.

According to the embodiment of the invention, the precursor of carbon is 10% of acetylene black.

According to the embodiment of the invention, a half-cell configuration of said $Li_{0.9}Nb_{0.1}FePO_4$/C has a C-rate discharge of more than 1500 nos. of cycles with a retention capacity at 10 C rate.

According to the embodiment of the invention, powder particles obtained during ball milling process are within the range of 39 nm to 47 nm size.

According to the embodiment of the invention, powder particles obtained during ball milling process are preferably of 42 nm size.

According to the embodiment of the invention, each pellet has a diameter about 10 mm and a thickness of 1.5 mm.

According to the embodiment of the invention, the pellets are sintered at least at $10^{-2}$ bar vacuum and at said predetermined temperature in range of 650-800° C. for said predetermined time of at least 10 hours to obtain a density of at least 3.6 g/cc.

According to the embodiment of the invention, the composition of $Li_{0.9}Nb_{0.1}FePO_4$ has a wider a channel for $Li^+$ diffusion, a minimum energy requirement for polaron and shows less resistance value.

The overall conductivity of the $LiFePO_4$ cathode material is enhanced by adopting the techniques like reduction of particle size by ball milling of precursors, by providing carbon coating over $LiNbFePO_4$ particles and by doping with different compositions of niobium in $Li_{1-x}Nb_xFePO_4$/C, where x is equal to 0-0.15.

Referring FIG. 1 shows XRD pattern of $Li_{1-x}Nb_xFePO_4$/C (x=0 to 0.16). The synthesized $Li_{1-x}Nb_xFePO_4$/C (x=0.05, 0.1, 0.15, 0.16) composites may be structurally characterized using X-ray diffraction by Panalytical x'pert pro X-ray diffractometer to identify orthorhombic formation.

FIG. 1 illustrates the formation of a single phase without signatures of impurities. The existence of sharp and well-defined Bragg peaks confirms the presence of phase pure and crystalline products. $Li_{1-x}Nb_xFePO_4$/C (x=0.05, 0.1, 0.15) composites exhibits standard orthorhombic olivine-type $LiFePO_4$ structure (JCPDS 83-2092, a=10.33 Å, b=5.98 Å, c=4.69 Å). It was seen that olivine structure of $LiFePO_4$ is maintained and formation of a solid solution is possible only up to niobium doping of x=0.15. At niobium doping of x=0.16, the structure has deviated from $LiFePO_4$ to $Fe_2Nb$ i.e. unformed LFP.

According to an embodiment, a mixture of (99.99% purity, Sigma Aldrich) lithium carbonate, iron oxalate and ammonium di-hydrogen phosphate precursors are taken in predefined stoichiometric ratios for synthesis of lithium iron phosphate ($LiFePO_4$) by solid state vacuum synthesis method. Niobium pentoxide is added as a precursor for doping of niobium at Li+ site of $LiFePO_4$ for synthesis of niobium doped $LiFePO_4$.

According to an embodiment, performing ball milling on said mixture of precursors dry ground obtains nano sized powder particles. Now, 10% of acetylene black is added as a precursor of carbon to said mixture of precursors and the ball milling operation is performed for synthesizing and obtaining carbon coated niobium doped $LiFePO_4$ nano sized powder particles.

According to an embodiment, when the ball milled mixture of precursors undergoes pre-calcination and final calcination, the carbon gets coated over each particle of niobium doped LiFePO4. The carbon coating will be in a few nanometers which can be confirmed by TEM. The carbon coating on the surface of LiFePO4 may be confirmed from Selected Area Diffraction Pattern (SADP) of TEM and with the help of carbon analyzer.

According to the embodiment, pellets are prepared and sintered from said synthesized nano powder particles at a predetermined temperature for a predetermined time.

According to an embodiment, the resultant sintered pellets may be structurally characterized by XRD, FTIR, SEM and EDS for identifying standard orthorhombic olivine type LiFePO4 structure. A composition of $Li_{0.9}Nb_{0.1}FePO_4$/C is preferable from one or more synthesized compositions of $Li_{1-x}Nb_xFePO_4$/C, where x is equal to 0-0.15.

According to the embodiment of the invention, a composition of $Li_{0.9}Nb_{0.1}FePO_4$/C is preferable and has a carbon content of about 8.8%.

According to the embodiment of the invention, powder particles obtained during ball milling process are within the range of 39 nm to 47 nm size.

According to the embodiment of the invention, the pellets are sintered at least at $10^{-2}$ bar vacuum and at said predetermined temperature in range of 650–800° C. for said predetermined time of at least 10 hours to obtain a density of at least 3.6 g/cc.

Figure 2:
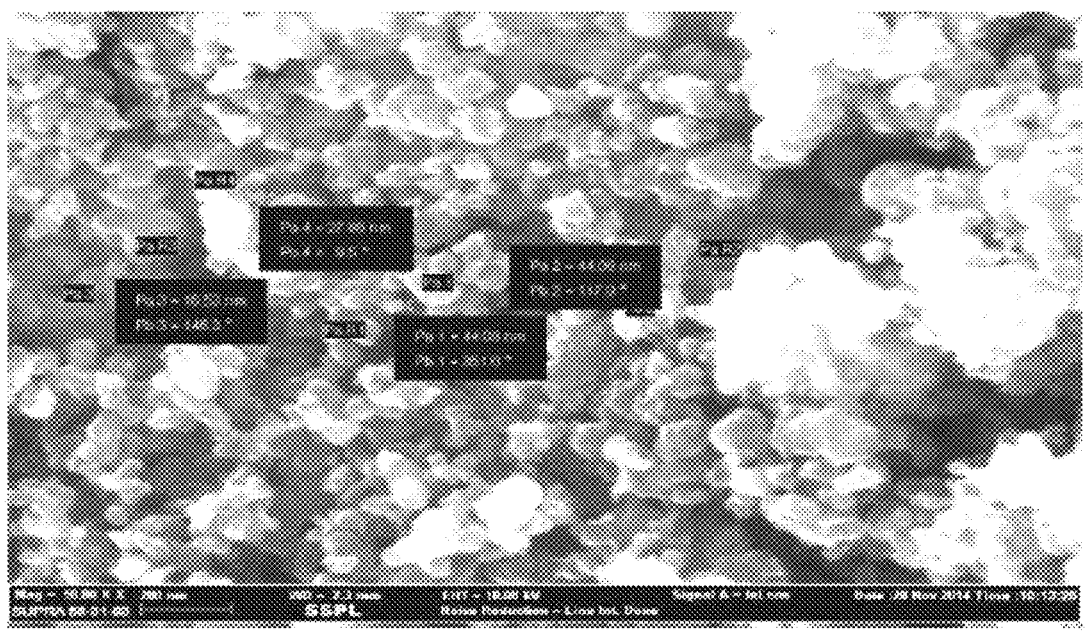
FIG. 2 (a) shows a scanning electron micrograph of LiNbFePO$_4$/C powder with an average particle size of 33 nm according to an embodiment of the present invention.
Figure 2:
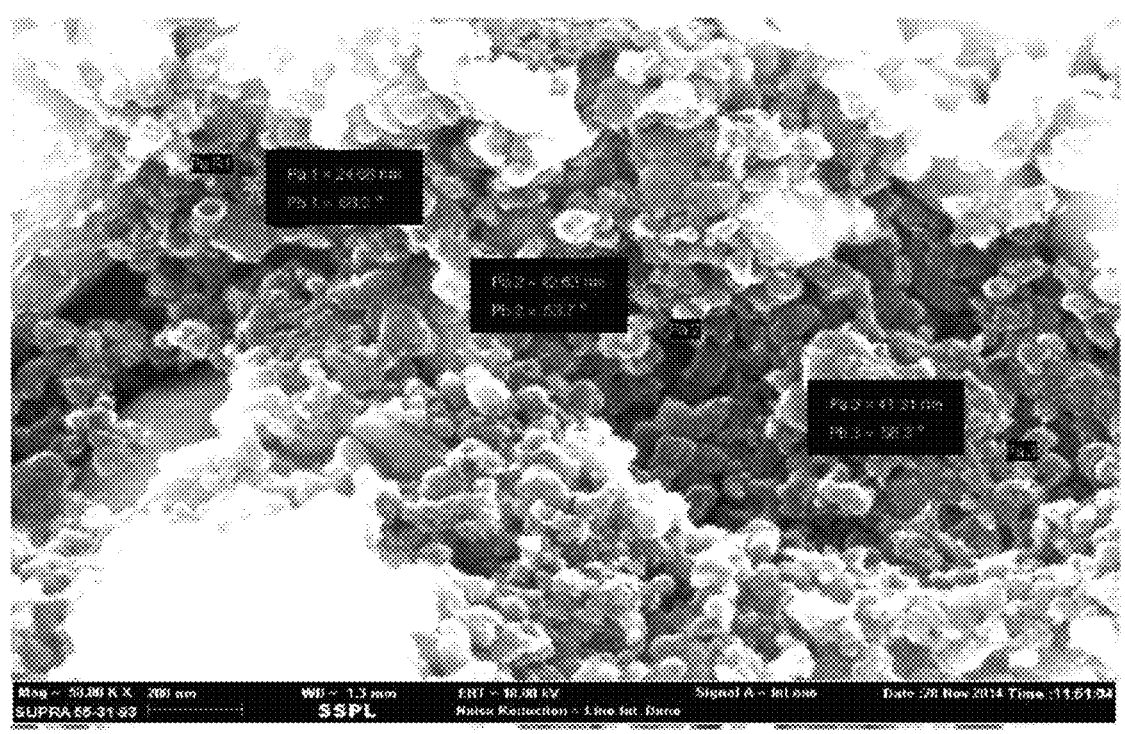
Figure 2:
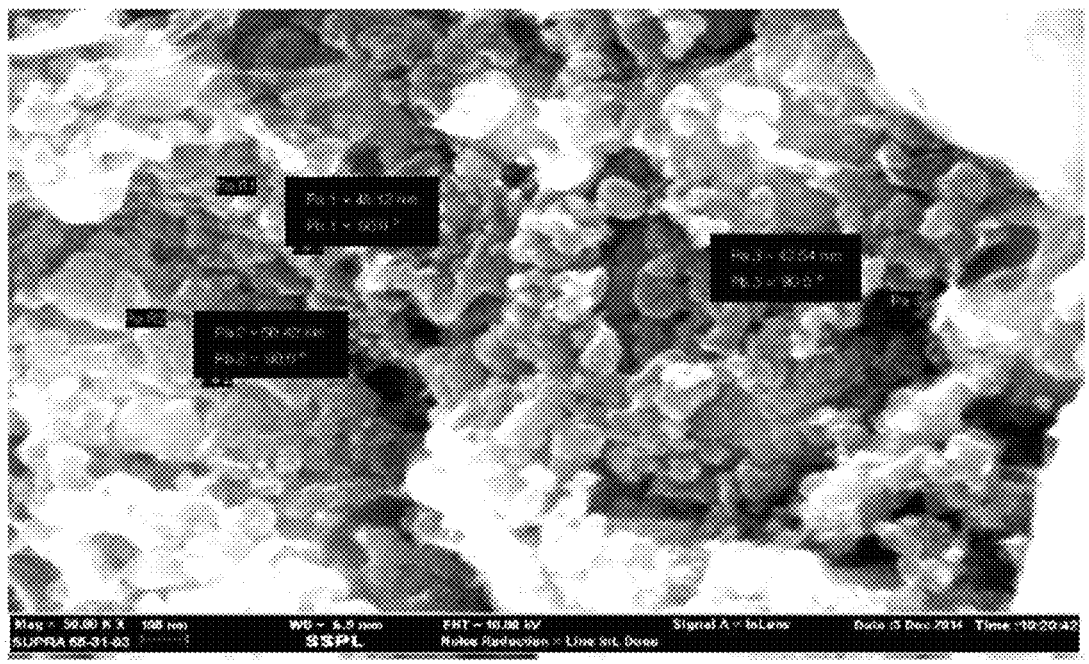
Figure 2:
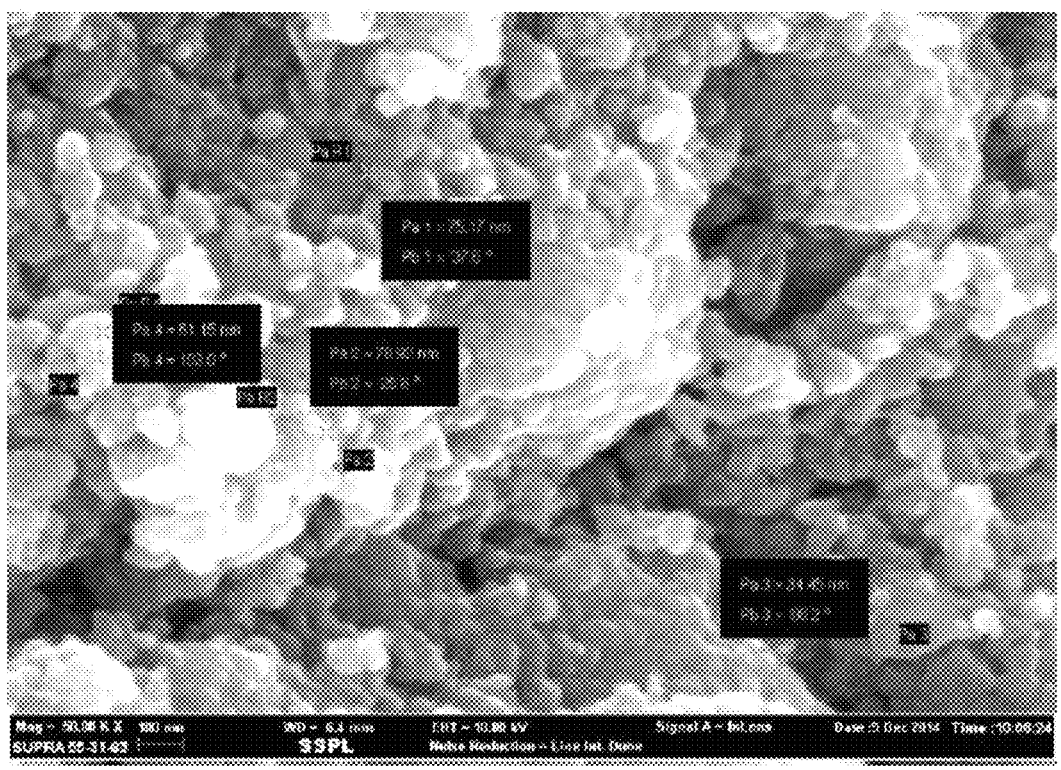

Referring FIG. 2 through FIGS. 2(a-d), shows the scanned electron micrograph (SEM) images of $LiFePO_4$/C powder with an average particle size 33 nm, $Li_{0.95}Nb_{0.05}FePO_4$ powder with an average particle size 36 nm, $Li_{0.9}Nb_{0.1}FePO_4$ powder with average particle size 47 nm, and $Li_{0.85}Nb_{0.15}FePO_4$ powder with average particle 62 nm. The presence of well-defined fine spherical particles is shown in FIGS. 2 (a), (b), (c) and (d), wherein the particle size is seen to be increasing with an increase in doping proportion of niobium.

Example 1

A high energy centrifugal ball mill (Model SFM-3, 030756) was used (1200 rpm) for dry grounding the mixture of precursors for different time intervals of 5, 10, 15 and 20 hours to obtain nano sized powder particles. It was observed that the particle size reduced from 350 nm to 183 nm after 5 hours of ball milling of said mixture of precursors, reduced to 108 nm after 10 hours, reduced to 42 nm after 15 hours and reduced to 39 nm after 20 hours. Particle sizes was measured with particle size analyzer, dynamic light scattering instrument model no. SZ-100, Horiba Instruments. The ball milling time to obtain nano sized powder particles may depend on the type of ball mill used i.e. when a ball mill of low capacity is used it may take more time for obtaining nano sized powder particle.

Example 2

Sintered pellets were prepared from synthesized nano powder particles at predetermined temperatures for predetermined time. The density of the pellet was found using Archimedes principle. Accordingly, 0.2 grams of synthesized material was taken in a mortar and a Polyvinyl alcohol was used as a binder. 5 grams of binder was mixed 100 ml of water and heated at 100° C. for 20 minutes. 2 to 3 drops of the binder was added to synthesized material and ground thoroughly. The grounded mixture was pressed into pellets of dimensions, 10 mm diameter and 1.5 mm thickness in a mold at 3 bar pressure for two minutes dwell time.

The pellets were kept in a vacuum furnace at $10^{-2}$ bar vacuum for sintering. Sintering was carried out at 650° C., 700° C., 750° C. and 800° C. for different durations. The compactness of the pellet was checked by fracturing the pellet. The bulk density of the sintered pellet was determined by weighing them in the air and after immersing them in water. It was found that sintering carried out at 700° C. sintering temperature for a duration of 12 hours resulted in a density of the pellet which is 3.6 g/cc, the density of LiFePO4.

Example 3

One or more synthesized compositions of $Li_{1-x}Nb_xFePO_4/C$, where x is equal to 0-0.15 were synthesized by solid-state vacuum synthesis method. Both material and electrochemical characterization of the synthesized powder was done. The powder was structurally characterized by XRD, FTIR, SEM, and EDS. Pellets prepared from synthesized powder were sintered and used to calculate dc conductivity and activation energy.

In general, the supervalent dopants which are successfully doped in the olivine structure without affecting the structural stability decrease the grain size due to cation vacancies created during charge compensation and also the presence of the dopant increases the size of the channel for Li+ diffusion, resulting in faster Li+ diffusion. It was observed that due to the lower electrical resistivity and higher ionic radius of niobium, the widening of the channel for Li+ diffusion is also more in the case of niobium which resulted in faster Li+ ion diffusion and in turn higher conductivity, and diffusion coefficient.

It was observed that the room temperature dc conductivity of $Li_{1-x}Nb_xFePO_4/C$ (x=0.05, 0.1, 0.15) was improved by Niobium (Nb) doping when compared to LiFePO$_4$/C and for $Li_{0.9}Nb_{0.1}FePO_4/C$ it was observed to be $51.6 \times 10^{-2}$ Scm$^{-1}$. It was also observed that the activation energy which is the energy required for polaron hopping was also minimum for $Li_{0.9}Nb_{0.1}FePO_4/C$.

To understand the effect the of niobium doping in detail, ac impedance measurement was carried out by fabricating coin cells in half-cell configuration containing solid state vacuum synthesized $Li_{1-x}Nb_xFePO_4/C$ (x=0.an 05, 0.1, 0.15) and compared with that of the respective LiFePO$_4$/C composites. The ac impedances were measured and diffusion coefficients were calculated for the cells in half-cell configuration. It was observed that the values of RΩ, Rf and Rct reduced when doped with niobium as compared to LiFePO$_4$/C, suggesting that the overall resistance decreased and Li+ migration improved. The composition of $Li_{0.9}Nb_{0.1}FePO_4/C$ showed minimum resistance values. Li+ diffusion coefficients (DLi+) was determined for LiFePO$_4$/C and $Li_{1-x}Nb_xFePO_4/C$ (x=0.05, 0.1, 0.15) using Warburg coefficients (W) which were obtained from ac impedance measurements. The composition of $Li_{0.9}Nb_{0.1}FePO_4/C$ was observed to have a diffusion coefficient of $16.21 \times 10^{-9}$ (cm$^2$ s$^{-1}$).

A chart of diffusion coefficient of solid vacuum synthesized $Li_{1-x}Nb_xFePO_4/C$ (x=0.05, 0.1, and 0.15) is as follows:

| Niobium doping (x) | D (cm$^2$ s$^{-1}$) |
| --- | --- |
| 0 | $0.626 \times 10^{-11}$ |
| 0.05 | $4.889 \times 10^{-9}$ |
| 0.1 | $16.21 \times 10^{-9}$ |
| 0.15 | $6.834 \times 10^{-9}$ |

Example 4

The improved electrochemical properties due to niobium doping was attributed to the shortened diffusion path distance and improved electrical conductivity. The coin cells with $Li_{0.9}Nb_{0.1}FePO_4/C$ cathodes were cycled in CR2032 half-cell configuration at different C-rates. The coin cells when discharged at C/10, 1 C, 5 C, 10 C, 15 C and 20 C yielded maximum specific capacities of 168.5 mAhg-1,143 mAhg-1, 128 mAhg-1, 110 mAhg-1, 85 mAhg-1 and 50 mAhg-1 respectively. It was observed that $Li_{0.9}Nb_{0.1}FePO_4/C$ based half cells yielded more than 1500 nos. of cycles at a 10 C rate with reasonable capacity retention.

Advantages

1. The overall conductivity of LiFePO$_4$ cathode material is enhanced by adopting the techniques like reduction of particle size by ball milling of precursors, by providing carbon coating over LiFePO$_4$ particles and by doping with different compositions of niobium in Nb$_x$FePO$_4$/C.
2. The room temperature dc conductivity LiFePO$_4$ cathode material is improved by Nb doping when compared to LiFePO$_4$/C.
3. The diffusion coefficients LiFePO$_4$ cathode material are improved by Nb doping when compared to LiFePO$_4$/C.
4. One or more compositions of $Li_{1-x}Nb_xFePO_4/C$ (x=0.05, 0.1, and 0.15) half cells have shown higher specific capacities than LiFePO$_4$/C.

There have been described and illustrated herein embodiments for a method of preparation of an electrode material for lithium-ion batteries. While particular embodiments of the invention have been described, it is not intended that the invention be limited thereto, as it is intended that the invention be as broad in scope as the art will allow and that the specification be read likewise. Thus, while particular types of compositions, particle sizes, structural characterization techniques, temperatures and time periods have been disclosed, it will be appreciated that other compositions, particle sizes, structural characterization techniques, temperatures and time periods may also be used.

Many modifications may be made without departing from the basic spirit of the present invention. Accordingly, it will be appreciated by those skilled in the art that the invention may be practiced other than has been specifically described herein.

The invention claimed is:
1. A method of preparing an electrode material for lithium-ion batteries comprising the steps of:
   a) preparing a mixture of lithium carbonate, iron oxalate and ammonium di-hydrogen phosphate precursors taken in predefined stoichiometric ratios for synthesis of lithium iron phosphate (LiFePO$_4$);
   b) adding niobium pentoxide as a precursor for doping of niobium at Li$^+$ site of LiFePO$_4$ for synthesis of niobium doped LiFePO$_4$;
   c) ball milling said mixture of precursors dry ground to obtain nano sized powder particles of niobium doped LiFePO$_4$;
   d) adding and ball milling a precursor of carbon to said mixture of precursors for synthesizing and obtaining carbon coated niobium doped LiFePO$_4$ nano sized powder particles; and e) preparing and sintering pellets from said synthesized nano powder particles at a predetermined temperature for a predetermined time;
wherein said mixture of precursors are synthesized by solid state vacuum synthesis.

2. The method as claimed in claim 1, wherein said synthesized nano powder particles comprise one or more compositions of $Li_{1-x}Nb_xFePO_4/C$ nano sized powder particles with a value of x in a range from 0 to 0.15.

3. The method as claimed in claim 1, wherein said synthesized nano powder particles comprise $Li_{0.9}Nb_{0.1}FePO_4/C$ a preferable composition having a carbon content of about 8.8%.

4. The method as claimed in claim 1, wherein said sintered pellets are structurally characterized for identifying standard orthorhombic olivine type $LiFePO_4$ structure.

5. The method as claimed in claim 1, wherein said precursor of carbon is 10% of acetylene black.

6. The method as claimed in claim 3, wherein a half-cell configuration of said composition of $Li_{0.9}Nb_{0.1}FePO_4/C$ has a C-rate discharge of more than 1500 nos. of cycles with a retention capacity at 10 C rate.

7. The method as claimed in claim 1, wherein said powder particles obtained during ball milling process are within the range 39 nm to 47 nm of size.

8. The method as claimed in claim 7, wherein said powder particles obtained during ball milling process are 42 nm of size.

9. The method as claimed in claim 1, wherein each pellet has a diameter of about 10 mm and a thickness of about 1.5 mm.

10. The method as claimed in claim 1, wherein said pellets are sintered at least at $10^{-2}$ bar vacuum and at said predetermined temperature in a range of 650-800° C. for said predetermined time of at least 10 hours to obtain a density of at least 3.6 g/cc.

11. A method of preparing an electrode material for lithium-ion batteries comprising the steps of:
a) preparing a mixture of lithium carbonate, iron oxalate and ammonium di-hydrogen phosphate precursors taken in predefined stoichiometric ratios for synthesis of lithium iron phosphate ($LiFePO_4$);
b) adding niobium pentoxide as a precursor for doping of niobium at $Li^+$ site of $LiFePO_4$ for synthesis of niobium doped $LiFePO_4$;
c) ball milling said mixture of precursors dry ground to obtain nano sized powder particles of niobium doped $LiFePO_4$;
d) adding and ball milling a precursor of carbon to said mixture of precursors for synthesizing and obtaining carbon coated niobium doped $LiFePO_4$ nano sized powder particles; and
e) preparing and sintering pellets from said synthesized nano powder particles at a predetermined temperature for a predetermined time;
wherein said pellets are sintered at least at $10^{-2}$ bar vacuum and at said predetermined temperature in a range of 650-800° C. for said predetermined time of at least 10 hours.

12. The method as claimed in claim 11, wherein said mixture of precursors are synthesized by solid state vacuum synthesis and said synthesized nano powder particles comprise one or more compositions of $Li_{1-x}Nb_xFePO_4/C$ nano sized powder particles with a value of x in a range from 0 to 0.15.

13. The method as claimed in claim 11, wherein said synthesized nano powder particles comprise $Li_{0.9}Nb_{0.1}FePO_4/C$ having a carbon content of about 8.8%.

14. The method as claimed in claim 11, wherein said sintered pellets are structurally characterized for identifying standard orthorhombic olivine type $LiFePO_4$ structure.

15. The method as claimed in claim 11, wherein said precursor of carbon is 10% of acetylene black.

16. The method as claimed in claim 13, wherein a half-cell configuration of said composition of $Li_{0.9}Nb_{0.1}FePO_4/C$ has a C-rate discharge of more than 1500 nos. of cycles with a retention capacity at 10 C rate.

17. The method as claimed in claim 11, wherein said powder particles obtained during ball milling process are within the range 39 nm to 47 nm of size.

18. The method as claimed in claim 17, wherein said powder particles obtained during ball milling process are 42 nm of size.

19. The method as claimed in claim 11, wherein each pellet has a diameter of about 10 mm and a thickness of about 1.5 mm.

* * * * *